US007188265B2

(12) United States Patent
Kurakata et al.

(10) Patent No.: US 7,188,265 B2
(45) Date of Patent: Mar. 6, 2007

(54) METHOD OF RECOGNIZING A CARD USING A SELECT SIGNAL DURING A DETERMINATION MODE AND SWITCHING FROM LOW TO HIGH RESISTANCE AFTER THE DETERMINATION

(75) Inventors: Shigeo Kurakata, Kawagoe (JP); Kunihiro Katayama, Chigasaki (JP); Motoki Kanamori, Tachikawa (JP); Atsushi Shikata, Higashimurayama (JP); Tetsuya Iida, Kokubunji (JP)

(73) Assignees: Renesas Technology Corp., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 369 days.

(21) Appl. No.: 10/716,456

(22) Filed: Nov. 20, 2003

(65) Prior Publication Data

US 2004/0117553 A1    Jun. 17, 2004

(30) Foreign Application Priority Data

Dec. 3, 2002    (JP) .............................. 2002-350999

(51) Int. Cl.
*G06F 1/26*    (2006.01)
(52) U.S. Cl. ........................ 713/320; 713/330; 713/340
(58) Field of Classification Search ................ 713/300, 713/310, 320, 330, 340
See application file for complete search history.

(56) References Cited

U.S. PATENT DOCUMENTS

| | | | | |
|---|---|---|---|---|
| 4,335,417 A | * | 6/1982 | Sakshaug et al. ........... 361/127 |
| 4,610,203 A | * | 9/1986 | Bock ........................... 102/217 |
| 5,095,282 A | * | 3/1992 | Dayton ......................... 330/69 |
| 5,585,741 A | * | 12/1996 | Jordan .......................... 326/30 |
| 6,339,805 B1 | * | 1/2002 | Maul ........................... 710/300 |
| 6,557,754 B2 | * | 5/2003 | Gray et al. ................. 235/375 |
| 6,901,457 B1 | * | 5/2005 | Toombs et al. ............... 710/11 |
| 2002/0091888 A1 | * | 7/2002 | Streitenberger et al. .... 710/305 |
| 2003/0212848 A1 | * | 11/2003 | Liu et al. .................... 710/305 |

OTHER PUBLICATIONS

Hiroto Okada, "Making Full Use of Multimedia Card," Interface, CQ Publishing Co., Ltd. Dec. 1999, vol. 25, No. 12, pp. 124-131 (with English translation).

* cited by examiner

*Primary Examiner*—Chun Cao
*Assistant Examiner*—Malcolm Cribbs
(74) *Attorney, Agent, or Firm*—Miles & Stockbridge PC

(57) ABSTRACT

A memory card is provided in which power consumption is reduced by the pull-up resistor of an input terminal and a misoperation induced by the pull-down resistor of a host apparatus is prevented. The memory card has a select terminal connected to the pull-up resistor. When the mode of the memory card is determined based on an input from the select terminal, a relatively low resistance value is selected for the pull-up resistor of the select terminal before a determination timing and the pull-up resistor is restored to an initial resistance value after the mode determination. A relatively high resistance value reduces a leakage current consumed by the pull-up resistor of the select terminal. When a pull-down resistor is connected to the terminal of a memory card host to which the memory card is attached, if the resistance value of the pull-up resistor is excessively high, it is influenced by the drawing in of a current by the pull-down resistor. If the resistance value of the pull-up resistor of the select terminal is lowered at the time of mode determination, an adverse effect of the lowering of a potential by the pull-down resistor can be circumvented.

10 Claims, 9 Drawing Sheets

METHOD OF RECOGNIZING A CARD USING A SELECT SIGNAL DURING A DETERMINATION MODE AND SWITCHING FROM LOW TO HIGH RESISTANCE AFTER THE DETERMINATION

BACKGROUND OF THE INVENTION

The present invention relates to a memory card such as Multimedia Card (registered trademark) or to an electronic device.

Multimedia Card (registered trademark) is a kind of a memory card which is embodying a simplified interface and reduced in size and weight. The Multimedia Card has seven connector terminals as external interface terminals. Since a serial interface has been adopted, a load on a host system can be reduced compared with an ATA (AT Attachment) interface adopted by a PC card or a hard disk, which renders the Multimedia Card usable in a simpler and easier system (See Non-Patent Document 1). There is also SD Card (registered trademark) which is another memory card derived from the standards of the Multimedia Card (registered trademark). The SD Card includes the external terminals of the Multimedia Card, while some types of the Multimedia Card include the command specifications of the SD Card. Of SD Card hosts (host apparatus primarily using the SD Card), there are some which not only use the Multimedia Card as the SD Card but also attempt to use the Multimedia Card as it is. In the present specification, the Multimedia Card (registered trademark), the SD Card (registered trademark), and an SD Card host will be termed simply as an M card, an S card, and an S card host hereinafter, respectively.

[Non-Patent Document 1]

Hiroto Okada, "Making Full Use of Multimedia Card," Interface, CQ Publishing Co., Ltd., December, 1999, Vol. 25, No. 12, pp. 124–131.

SUMMARY OF THE INVENTION

The present inventors have examined the possibility of ensured use of an M card as it is by an SD Card host.

To prove the possibility, the present inventors have focused attention on a card recognizing operation performed by the S card host by using a chip select (CS) terminal. In accordance with the standards of the S card, the CS terminal of the S card host is pulled down at 10 kilo-ohm (kΩ) and the CS terminal of the S card is pulled up at 50 kilo-ohm (kΩ). In the operation of recognizing the S card, the S card host drives the CS terminal to the HIGH level. At this time, even a current path resulting from the pull-up resistor of the S card and the pull-down resistor of the S card host is insufficient to hinder the HIGH-level driving by the S card host. There are cases where the pull-up resistor of the CS terminal of the M card is set to 1.5 mega-ohm (MΩ) in terms of reducing a standby current. The present inventors have proved that, if the S card host performs a similar recognizing operation with respect to the M card, the pull-down resistor of the S card host draws in a current in the vicinity of the CS terminal of the M card so that a level drop occurs at the CS terminal of the M card, which may result in false mode recognition by the M card. Specifically, the M card has an MMC mode and an SPI mode as card modes and a card selecting method and the allocation of functions to the terminals differ according to the card modes. The allocation of functions to the terminals in the MMC mode is the same as that for the S card. The foregoing operation of recognizing the S card by the S card host is the same as the operation of setting the MMC mode to the M card in terms of driving the CS terminal. In other words, the M card can be set to the MMC mode by driving the CS terminal to the HIGH level. In an actual situation, however, the M card judges that the CS terminal has been driven to the LOW level due to the drawing in of the current in the vicinity of the CS terminal by the pull-down resistor of the S card host and the resultant potential drop and therefore shits to the SPI mode.

This prevents the S card host from accessing the M card as the SD card in terms of the function of command and data allocation to the interface terminals and also prevents the S card host from accessing the M card in the MMC mode.

It is therefore an object of the present invention to provide a memory card and an electronic device in each of which power consumption resulting from the pull-up resistor of an input terminal is reduced and a misoperation induced by the pull-down resistor of a host apparatus is less likely to occur.

Another object of the present invention is to provide a memory card as an M card which can be accessed by an S card host.

The above and other objects and novel features of the present invention will become apparent from the description of the present specification and the accompanying drawings.

A brief description will be given to the outline of the representative aspects of the present invention disclosed in the present application.

(1) In an aspect of the present invention, a memory card comprises: a plurality of external terminals; an interface unit; and an erasable and writable nonvolatile memory, wherein the plurality of external terminals include a select terminal connected to a pull-up resistor and the interface unit selects a relatively low resistance value for the pull-up resistor of the select terminal before performing mode determination for the memory card based on an input from the select terminal and selects a relatively high resistance value after the mode determination.

The relatively high resistance value adopted at times other than when mode determination is performed operates to reduce a leakage current consumed by the pull-up resistor of the select terminal. In terms of lower power consumption, the resistance value of the pull-up resistor is preferably higher. If the case where a pull-down resistor is connected to the terminal of a memory card host to which the memory card is attached is assumed, however, an excessively high pull-up resistance value is influenced by the drawing in of a current by the pull-down resistor. By lowering the resistance of the pull-up resistor of the select terminal during mode determination, such an adverse effect of the lowering of a potential by the pull-down resistor can be circumvented.

In a specific embodiment of the present invention, the mode determination for the memory card is performed in response to reception of an initialization command (CMD0) to the memory card.

In a specific embodiment of the present invention, when the mode determination is performed, the interface unit sets an interface mode with an outside to a first operating mode in response to a HIGH level of the select terminal and sets the interface mode with the outside to a second operating mode in response to a LOW level of the select terminal. For example, the memory card is based on a standard of Multimedia Card, the first operating mode is an SPI mode, and the second operating mode is an MMC mode.

In another specific embodiment of the present invention, the selection of the low resistance value is performed stepwise and the stepwise selection assumes that a lower resistance value is selected earlier. When a signal change is caused at the select terminal prior to the determination timing, the change is accelerated. This ensures the termination of the signal change at the terminal, which is necessary for the card mode determination, well ahead of the timing for the card mode determination even in a special case where the noise immunity of the memory host is low or the operating speed is over a maximum permissible speed. In short, the reliability of the card-mode determining operation in adverse environments can further be enhanced.

In the memory card according to the present invention, the plurality of external terminals include a data terminal having a pull-up resistor and the interface unit selects a relatively low resistance value for the pull-up resistor of the data terminal during a period after a write command until a start bit of data to be written which is supplied to the data terminal is detected and selects a relatively high initial resistance value after the detection of the start bit. This enhances the reliability of the detection of the leading portion of the data to be written even in the case where the noise immunity of a data input system is low or degraded.

(2) In another aspect of the present invention, a memory card comprises: a plurality of external terminals; and an internal circuit having erasable and writable nonvolatile storing means, wherein the internal circuit lowers, in performing mode determination in response to an initialization command and based on an input from a select terminal as one of the external terminals, a resistance value of a pull-up resistor of the select terminal before a determination timing and restores the pull-up resistor to an initial resistance value after the mode determination. By lowering the resistance value of the pull-up resistor of the select terminal during the mode determination, the adverse effect of the lowering of the potential by the pull-down resistor can be circumvented.

Alternatively, the internal circuit lowers, during a period after a write command until a start bit of data to be written which is supplied to a data terminal as one of the external terminals is detected, a resistance value of a pull-up resistor of the data terminal and restores the pull-up resistor to an initial value after the detection of the start bit. This enhances the reliability of the detection of the leading portion of the data to be written even in the case where the noise immunity of the data input system is low or degraded.

(3) In still another aspect of the present invention, an electronic device comprises: a plurality of external terminals; and an internal circuit, wherein the internal circuit relatively lowers, in performing mode determination in response to an initialization command and based on an input from a select terminal as one of the external terminals, an input impedance of the select terminal before a determination timing and returns the input impedance to an initial value after the mode determination. By lowering the input impedance of the select terminal during the mode determination, the adverse effect of the lowering of the potential by the pull-down resistor can be circumvented.

Alternatively, the internal circuit relatively lowers, during a period after a write command until a start bit of data to be written which is supplied to a data terminal as one of the external terminals is detected, an input impedance of the data terminal and returns the input impedance to an initial value after the detection of the start bit. This enhances the reliability of the detection of the leading portion of the data to be written even in the case where the noise immunity of the data input system is low or degraded.

DESCRIPTION OF THE PREFERRED EMBODIMENTS

Figure 1:
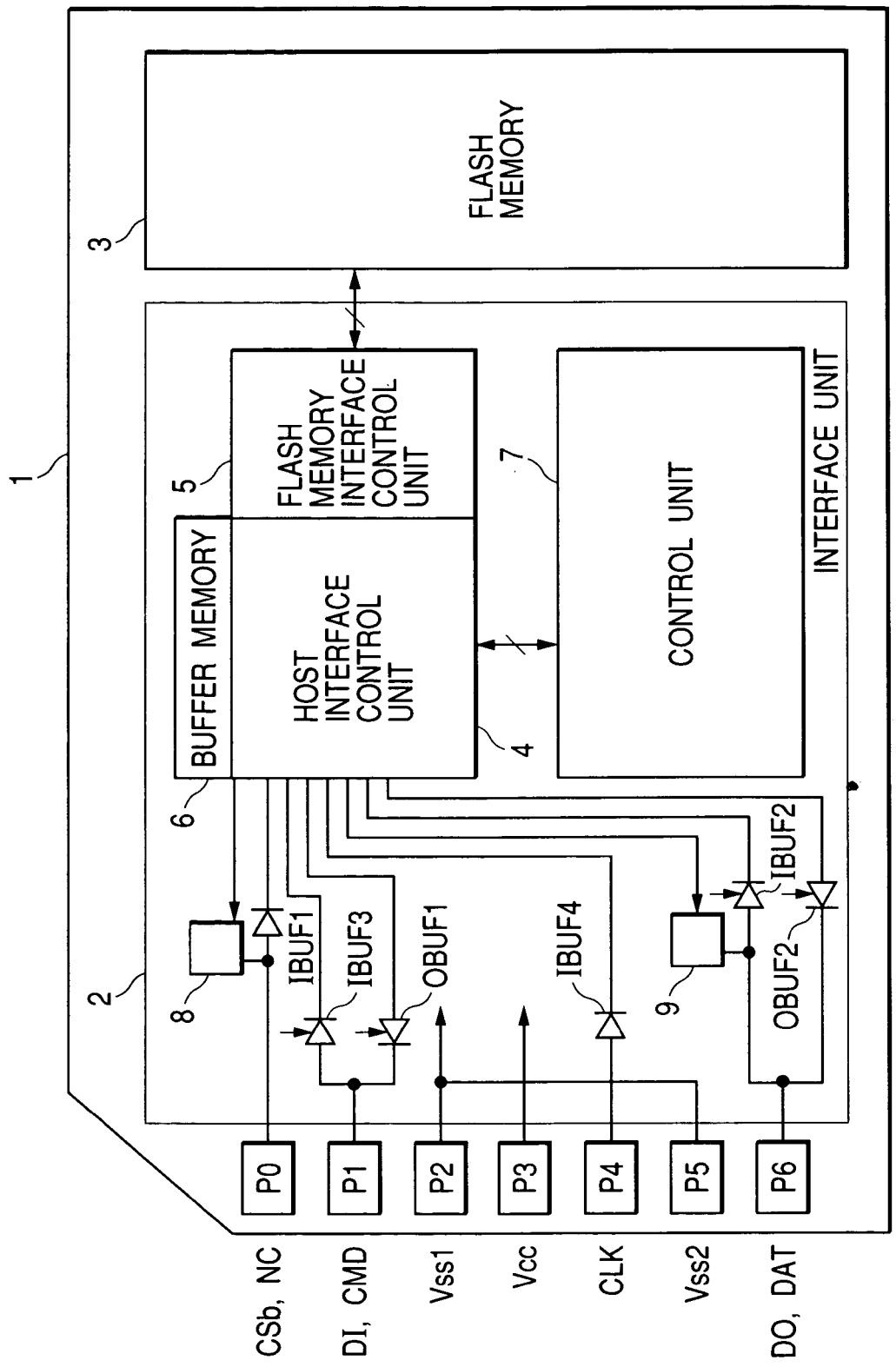
FIG. 1 is a block diagram of an M card according to an embodiment of the present invention.

FIG. 1 illustrates an example of an M card according to an embodiment of the present invention. An M card 1 has a substrate which is 1.4 mm in thickness and 24 mm×32 mm in planar dimensions. At the surface of the M card 1 to be provided with terminals, seven connector terminals P0 to P6 as rectangular external terminals having the same configuration are disposed in equispaced relation. The connector terminals P0 to P6 are connected to an interface unit 2, to which a flash memory 3 is connected as an erasable and writable nonvolatile memory.

A detailed depiction of the flashed memory 3 is not provided particularly but it can adopt a structure using a nonvolatile memory cell of floating-gate type which has a threshold voltage controlled in accordance with an amount of accumulated charge or a polarity or a structure using a nonvolatile memory cell of locally-trapped-charge type such as a MONOS (Metal Oxide Nitride Oxide Semiconductor) which stores information based on a location at which the charge is trapped relative to source/drain electrodes. The number of bits of information stored in one memory cell is not limited to one bit. A multi-bit configuration for storing two or more bits may also be used.

The interface unit 2 has the host interface control unit 4, flash memory interface control unit 5, and buffer memory 6 of the M card 1 and a control unit 7 for controlling the foregoing elements. The control unit 7 can be composed of, e.g., a single-chip microcomputer. Input buffers IBUF1 to IBUF4 and output buffers OBUF1 and OBUF2 are disposed between the host interface control unit 4 and the connector terminals P0 to P6 in accordance with the functions of the terminals. Pull-up resistor circuits 8 and 9 are disposed in respective stages previous to the input buffers IBUF1 and IBUF2.

The M card 1 has an MMC mode and an SPI (Serial Peripheral Interface) mode. A plurality of M cards 1 can share a bus. In other words, a large number of M cards can be connected to a single M card host. The difference between the MMC mode and the SPI mode is the specifications of an external interface and an M-card selecting method.

In accordance with the specifications of the external interface of the MMC mode, the seven connectors P0 to P6 are operated to function as a reserve terminal (which is either open or fixed to a logic value "1") NC, a command terminal (I/O terminal for receiving a command and outputting a response signal) CMD, circuit-ground-voltage (grounding) terminals Vss1 and Vss2, a power-voltage supply terminal Vcc, a clock input terminal CLK, and a data I/O terminal DAT. In accordance with the specifications of the external interface of the SPI mode, the seven connectors P0 to P6 are operated to function as a chip select terminal (negative logic) CSb, a data input terminal (for the inputting of data and a command from the host apparatus to the card) DI, circuit-ground-voltage (grounding) terminals Vss1 and Vss2, a power-voltage supply terminal Vcc, a clock input terminal CLK, and a data output terminal (for the outputting of data and a status from the memory card to the host apparatus) DO.

In accordance with the M-card selecting method of the MMC mode, an M card to be accessed is selected from among a plurality of M cards by allocating distinct relative addresses (RCA: Relative Card Addresses) to the individual cards in a one-to-one correspondence in a flow of card recognition and specifying one of the relative addresses. The card recognition is performed by the following operations. When the MMC mode has been specified for a plurality of M cards connected commonly to a bus, if a predetermined command is issued from the host apparatus of the M cards (M card host) to a command line (signal line to which the command terminal CMD is connected), the memory cards in a ready state simultaneously outputs card identification information (CID: Card Identification Number) with the same timing onto the command line on a per-bit basis. The command line has an open drain architecture so that an output to the command line becomes, e.g., a LOW-level or high-output impedance. Each of the memory cards compares, on each output of 1 bit, the state of the command line with the value of the corresponding bit in the card identification information of its own. If they are different, the memory card halts the operation of transmitting the CID and returns to the ready state. As a result, the one of the memory cards having the smallest CID value is allowed to eventually complete the transmission of the CID value of its own to the end and shifts to an identification state. An RCA is set to the memory card that has shifted to the identification state. By repeating the recognizing operation a plurality of times, the RCAs are set to all the memory cards.

In the SPI mode, a chip select signal has been connected to the foregoing chip select terminal CSb of each of the plurality of cards. The selection of the M card to be accessed is performed appropriately by asserting, to a select level, the chip select signal to the card to be accessed.

Figure 2:
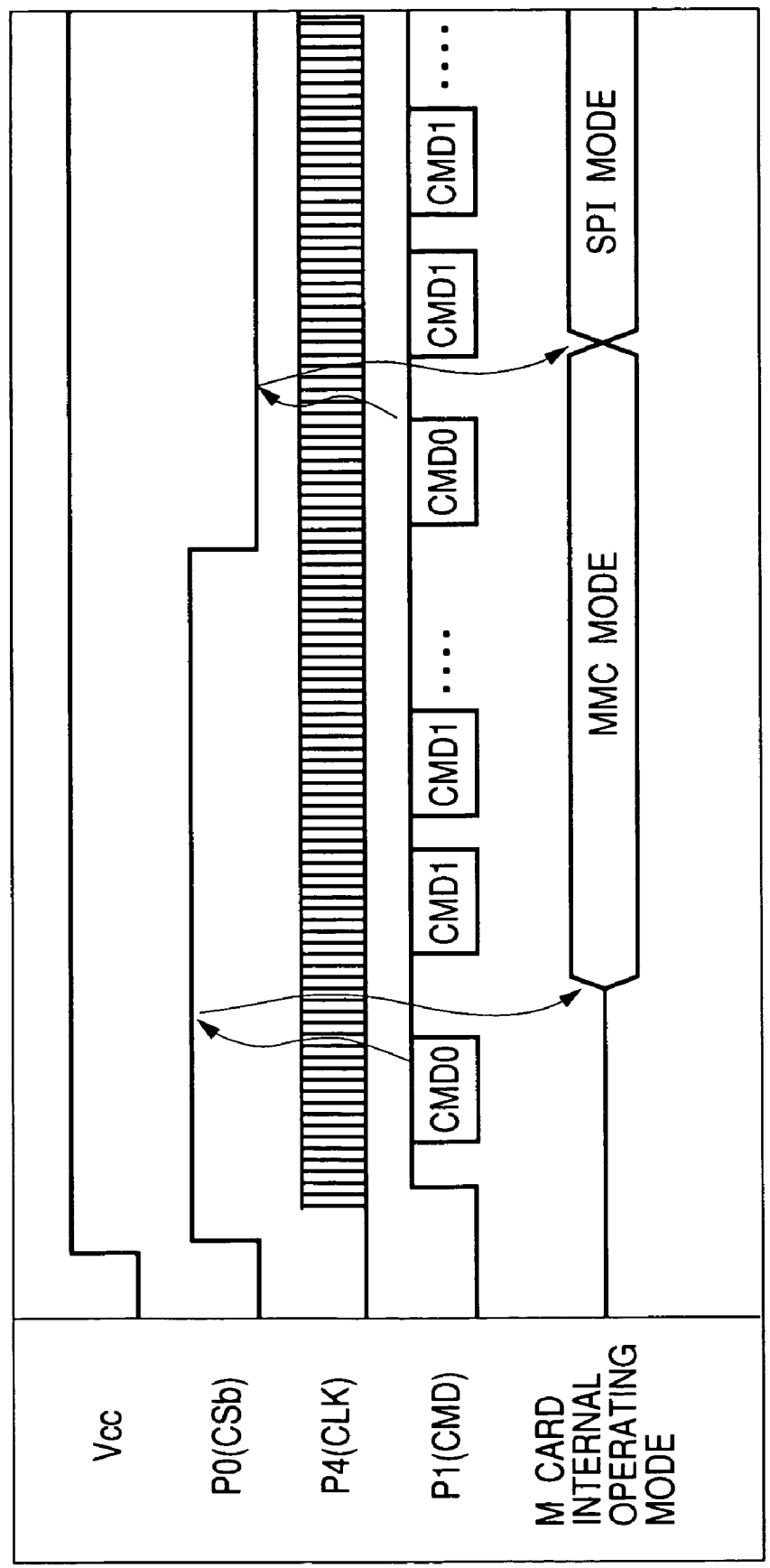
FIG. 2 is a timing chart schematically showing an initialization sequence for the M card.

A brief description will be given to an initialization sequence for the M card. When an operation power source Vcc is turned ON, a clock signal is inputted from the terminal P4 (clock terminal CLK) and a command is inputted from the terminal P1 (command terminal CMD), as illustrated in FIG. 2. If an initialization command CMD0 is inputted, the M card shifts to the MMC mode when the level of the terminal P0 (terminal CSb) at that time is HIGH and shifts to the SPI mode when the level of the terminal P0 at that time is LOW. Even after the power source is turned ON, if the initialization command CMD0 is inputted again, the card mode can be changed depending on the level of the terminal P0 (terminal CSb) at that time. It follows therefore that, if the level to which the terminal P0 (terminal CSb) is driven by the M card host is inverted in the vicinity of the terminal P0 (terminal CSb) in the initialization sequence for the M card or the like, the specifications of the external interface recognized by the M card differs from the specifications of the interface recognized by the card host, which disables the inputting and outputting of data. This is because the terminal P1 which functions as the command response I/O terminal CMD in the MMC mode is operated to function as the data command I/O terminal DI in the SPI mode, while the terminal P6 which functions as the data I/O terminal DAT in the MMC mode is operated to function as the data response I/O terminal DO in the SPI mode, as is apparent from the different functions of the terminals in the MMC mode and in the SPI mode.

The pull-up resistor circuit 8 is disposed to eliminate factors causing the unstabilization of the terminal CSb, the detailed description of which will be given herein below.

Figure 3:
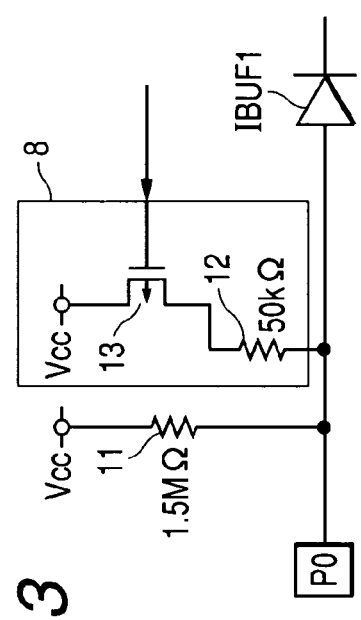
FIG. 3 is a circuit diagram illustrating a pull-up resistor circuit.

FIG. 3 illustrates the pull-up resistor circuit 8 described above. The pull-up resistor circuit 8 is composed of a pull-up resistor 12 disposed in parallel with, e.g., a 1.5-MΩ pull-up resistor 11 disposed in a stage previous to the input buffer IBUF1 and a p-channel switch transistor 13 disposed in series to the pull-up resistor 12. The pull-up resistor 12 has been set to a resistance value lower than that of the pull-up resistor 11, e.g., 50 kΩ. The foregoing 1.5-MΩ pull-up resistor 11 is also disposed in a stage previous to each of the other input buffers IBUF2 to IBUF4 to stabilize the state of an input when the input is halted. Accordingly, a high resistance value has been set in terms of minimizing power consumption resulting from a leakage current.

Figure 4:
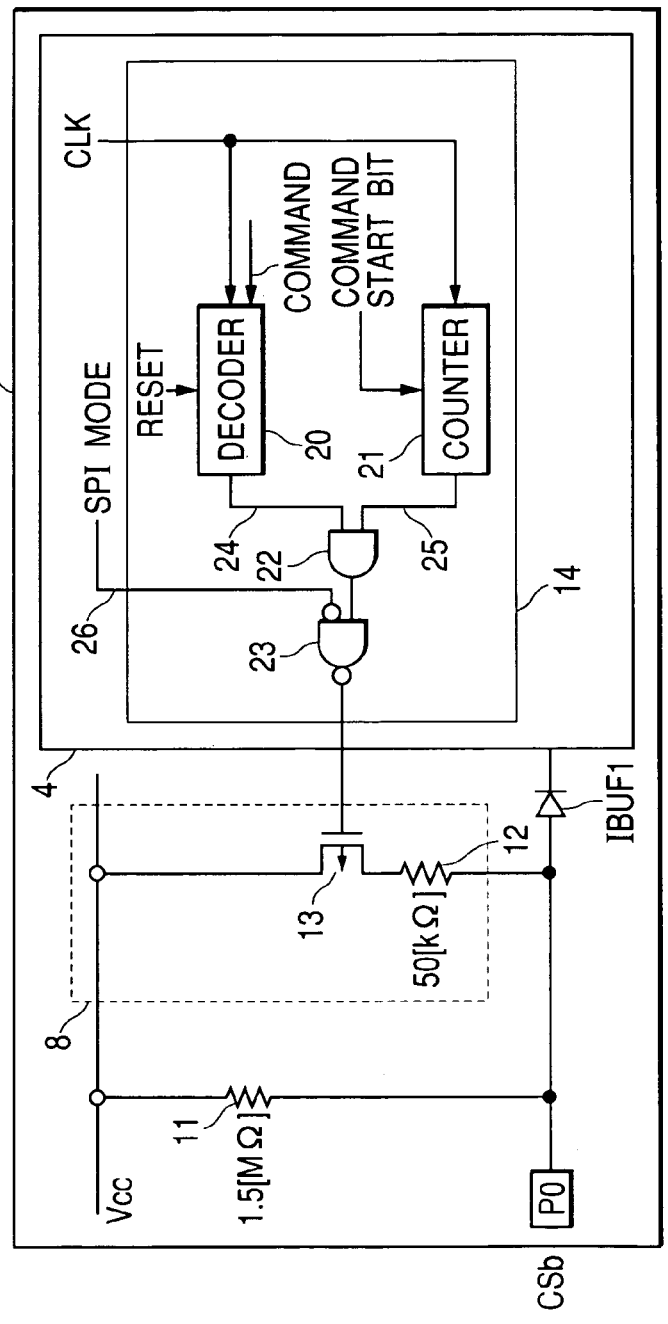
FIG. 4 is a circuit diagram illustrating a control logic circuit for a switch transistor.

FIG. 4 illustrates a control logic circuit 14 for the switch transistor 13, which is composed of a decoder 20 operating in synchronization with the clock signal CLK, a counter 21, an AND gate 22, and a NAND gate 23. The decoder 20 raises the output 24 thereof to the HIGH level by detecting a command index which is the first 8 bits of the initialization command CMD0. The counter 21 counts the inputted bits of the command in synchronization with the clock CLK and maintains the output 25 thereof at the HIGH level during a period from the 8-th bit counted from the start bit to the 48-th bit as the final bit. The output 24 of the decoder 20 is initialized to the LOW level in synchronization with the transition of the output 25 of the counter 21 from the HIHG level to the LOW level.

The AND gate 24 has two inputs, which are the output 24 of the decoder 20 and the output 25 of the counter 21. To the NAND gate 23, the output of the AND gate 22 and an inverted signal of a card mode signal 26, which is an internal signal, are inputted. The card mode signal 26 is asserted to the HIGH level in the SPI mode. The output of the NAND gate 23 is maintained at the LOW level during a period from the 8-th bit of the initialization command CMD0 counted from the start bit to the 48-th bit as the final bit in the state where the card mode is not the SPI mode. During the period, the switch transistor 13 is brought into the ON state so that the resistance value of the pull-up resistor is reduced gradually with the resistance value of the resistor 12.

Figure 5:
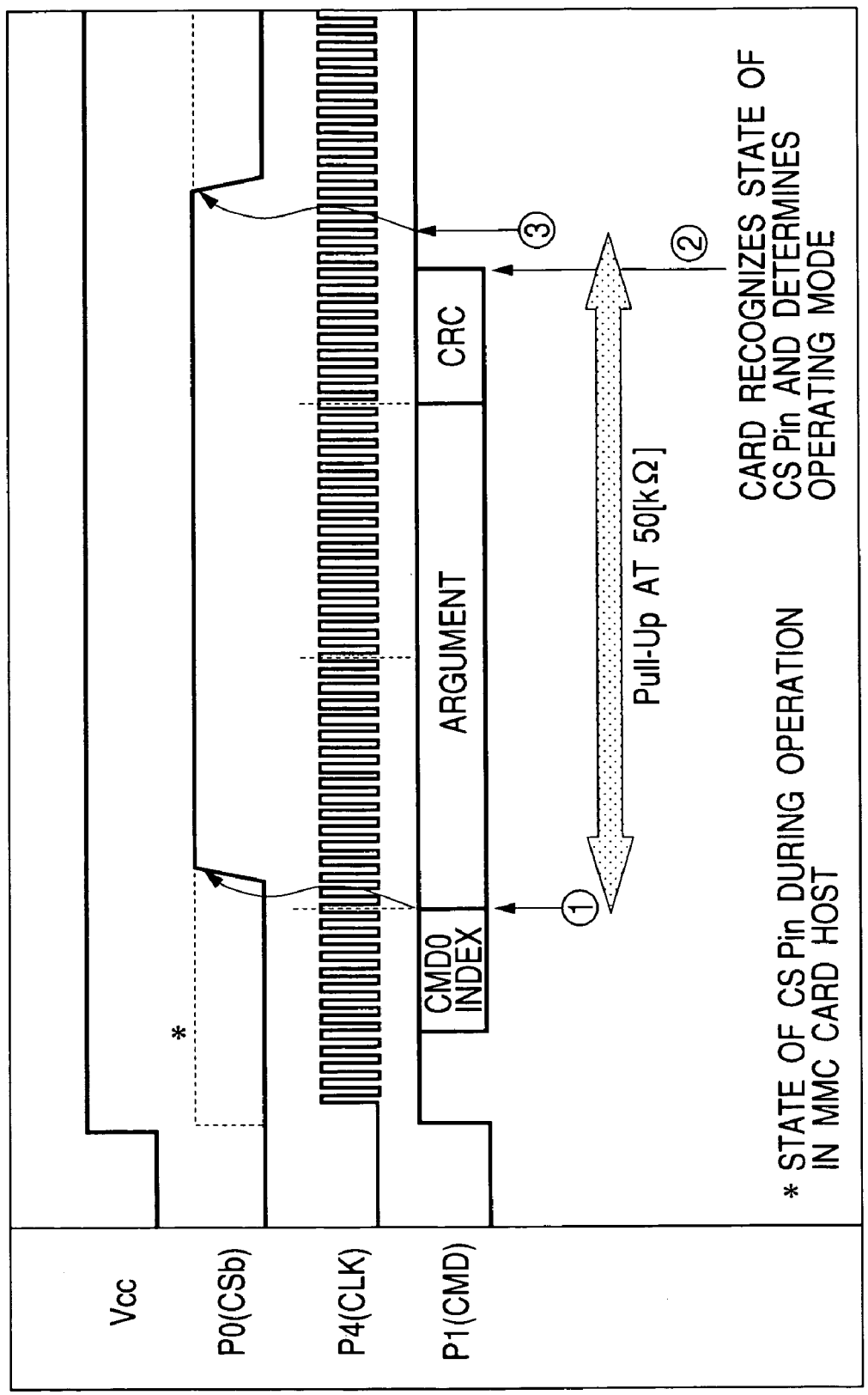
FIG. 5 is a timing chart illustrating a timing for a mode determining operation using the control logic of FIG. 4.
Figure 6:
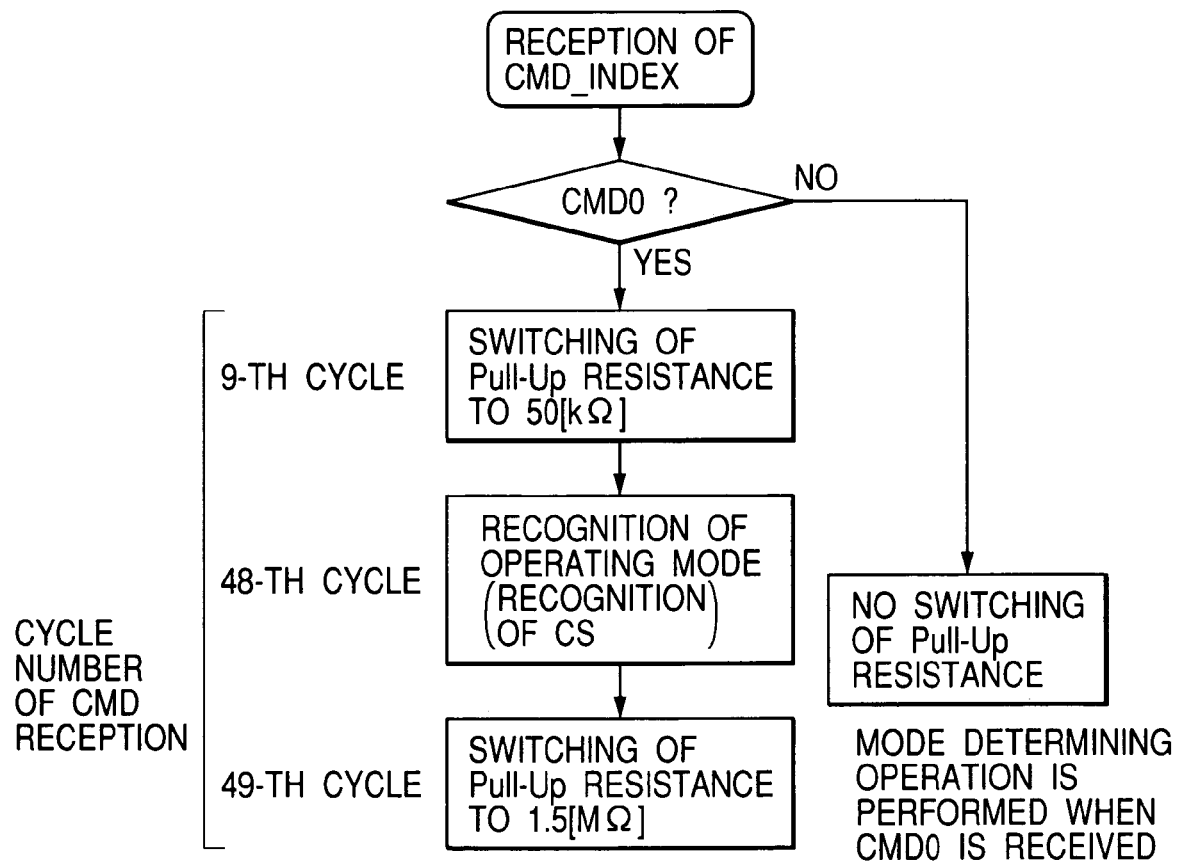
FIG. 6 is an operation flow of the mode determining operation using the control logic of FIG. 4.

FIG. 5 illustrates a timing for a mode determining operation using the control logic 14. FIG. 6 illustrates the flow of the mode determining operation. The initialization command CMD0 for performing the initialization sequence for the M card is composed of the 8-bit command index (CMD0 INDEX), a 32-bit argument, and an 8-bit CRC (Cyclic Redundancy Check) code. The detection of the command index of the initialization command CMD0 switches the pull-up resistor to 50 kΩ (□). At the end of the period T during which the initialization command CMD0 is received, the state of the terminal P0 is checked and the MMC mode or the SPI mode is determined based on the result of checking (□). Thereafter, the pull-up resistor is restored to 1.5 MΩ (□).

Figure 7:
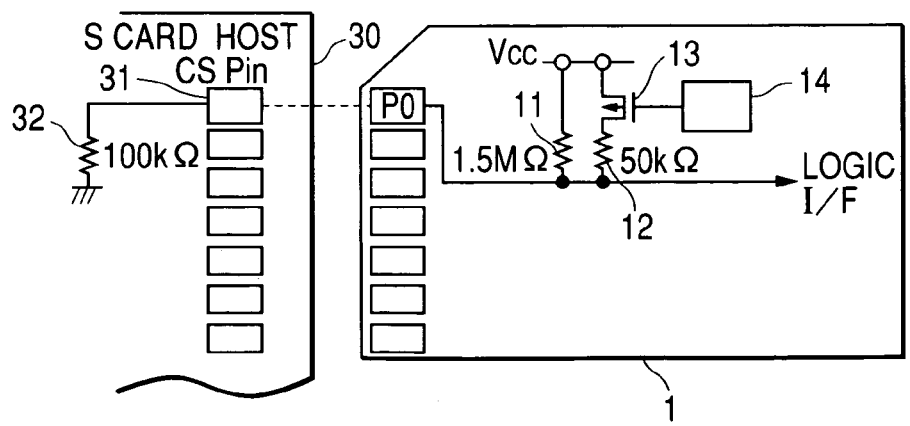
FIG. 7 is an illustrative view showing the state of the M card when it is used at an S card host for an S card compatible with the M card.

FIG. 7 shows the state of the M card 1 when it is used at an S card host for an S card which is compatible with the M card 1. The functions of the terminals of the S card are the same as those in the MMC mode. The S card host is constructed such that a single S card is connectable thereto. At the S card host 30, a chip select control terminal 31 corresponding to the terminal P0 of the M card is pulled down by a 100-kΩ pull-down resistor 32 in accordance with the standards thereof. The terminal of the S card connected to the chip select control terminal 31 is pulled down to 50 kΩ in the inside thereof. As stated previously, the M card 1 has the 1.5-MΩ pull-up resistor 11 and the 50-kΩ pull-up resistor 12.

Figure 8:
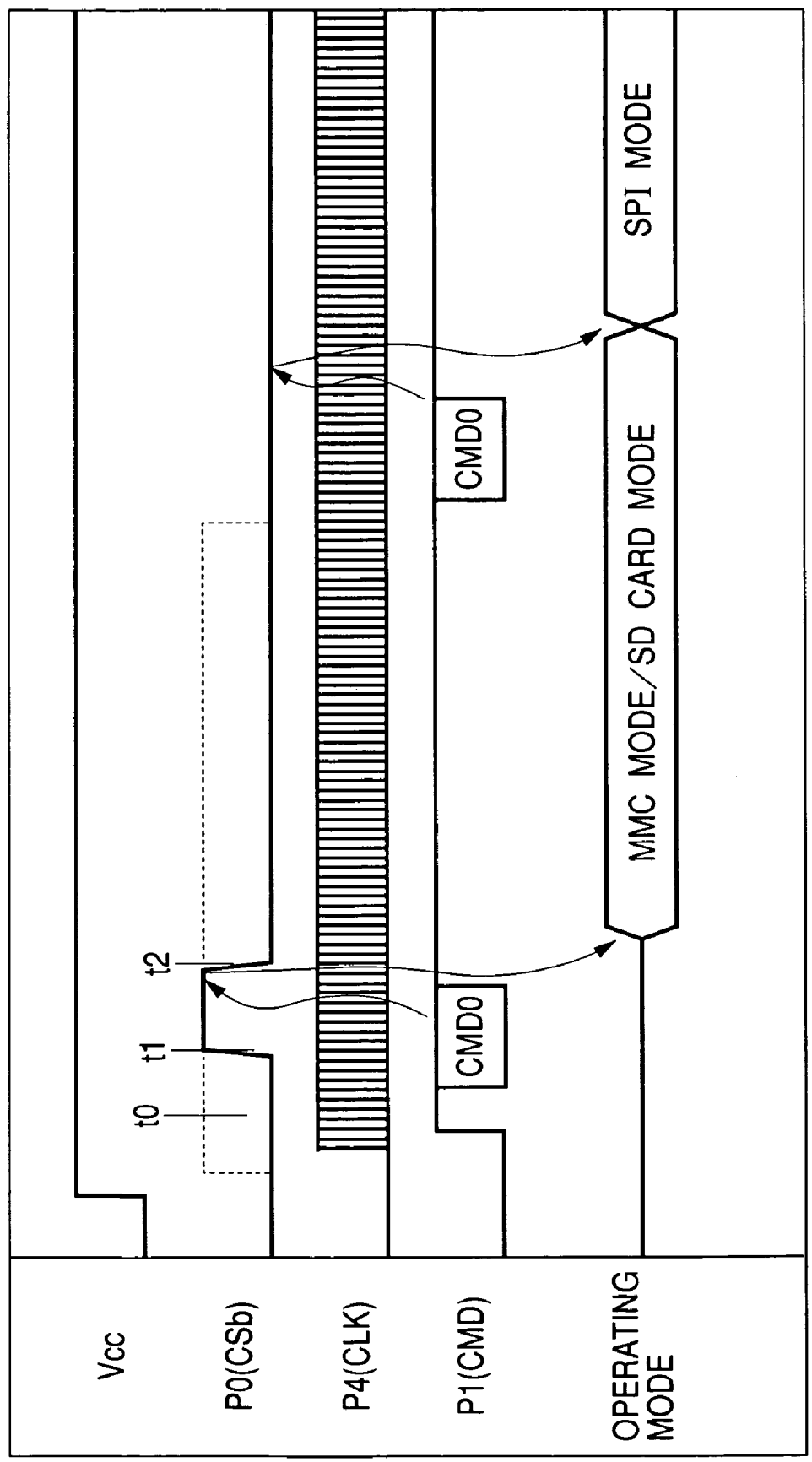
FIG. 8 is a timing chart illustrating a operation of recognizing the M card performed by the S card host.

FIG. 8 illustrates an operation of recognizing the M card 1 performed by the S card host 30. Here, the S card host 30 attempts to recognize the M card as the S card. The S card host 30 attempts to drive the terminal 31 connected to the terminal P0 of the M card 1 to the HIGH level in the operation of recognizing the S card. Since the resistance of the pull-down resistor 32 of the terminal 31 of the S card host 30 is 100 kΩ and the resistance of the pull-up resistor of the M card is 1.5 MΩ at this time, a current in the vicinity of the terminal P0 (CSb) of the M card is drawn in by the pull-down resistor 32 of the S card host 30 so that a level drop occurs at the terminal P0 of the M card. In short, the terminal P0 is held at the LOW level (t0). Heretofore, the process has been the same as that with the M card described above. If the initialization command CMD0 is supplied from the S card host 30 at this time, the circuit 14 switches the resistance of the pull-up resistor of the M card 1 to 50 kΩ in response to the detection of the command index by the circuit 14. As a result, a current is supplied from the pull-up resistor 12 to the pull-down resistor 32 to suppress the level drop at the terminal P0 resulting from the drawing in of the current by the pull-down resistor 32, so that the terminal P0 is restored to the HIGH level (t1), as shown in FIG. 8. The card recognizing operation is performed in this state, with the result that the M card is determined to be in the MMC mode and recognized as the S card by the S card host 30. Briefly, the M card is prevented from being undesirably recognized in the SPI mode and brought into an inaccessible state. After the recognizing operation, the resistance of the pull-up resistor of the M card is brought again to 1.5 MΩ and the terminal P0 is returned to the LOW level by the drawing in of the current by the pull-down resistor (t2). During the foregoing process, a leakage current resulting from the pull-up resistor 11 is extremely small in amount and the M card is superior to the S card in terms of low power consumption, which proves the significance of returning the pull-up resistor to the initial high resistance after the recognizing operation. In the drawing, the broken-line portion of the waveform at the terminal P0 indicates a waveform at the driving start side of the S card host 30, while the solid-line portion thereof indicates a waveform at the driving end side thereof. In the case where the terminal P0 is not driven by the S card host at all, which is shown for reference, the M card is inevitably brought into the SPI mode even if the initialization command CMD0 is supplied from the S card host 30. This indicates that the M card can be used in the SPI mode provided that the S card host 30 has the function of recognizing the M card. It is to be noted that, in FIG. 8, the SD card mode is the card mode of the S card, which indicates the same operating mode as the MMC mode of the M card.

Figure 9:
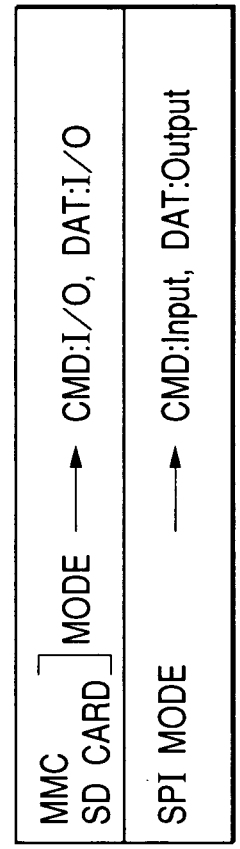
FIG. 9 is an illustrative view showing the state in which an interface has different functions according to card modes.

The foregoing M card 1 is allowed to be set to the MMC mode when the M card is recognized as the S card by the S card host 30. Although the interface has different functions according to the card mode as illustrated in FIG. 9, there is no such a case where the M card 1 is undesirably recognized in the SPI mode so that the M card 1 is prevented from being brought into the state in accessible by the S card host 30. After the recognizing operation, the pull-up resistor of the M card is restored to 1.5 MΩ so that a leakage current resulting from the pull-up resistor 11 is extremely small in amount and the M card is superior to the S card in terms of low power consumption.

Figure 10:
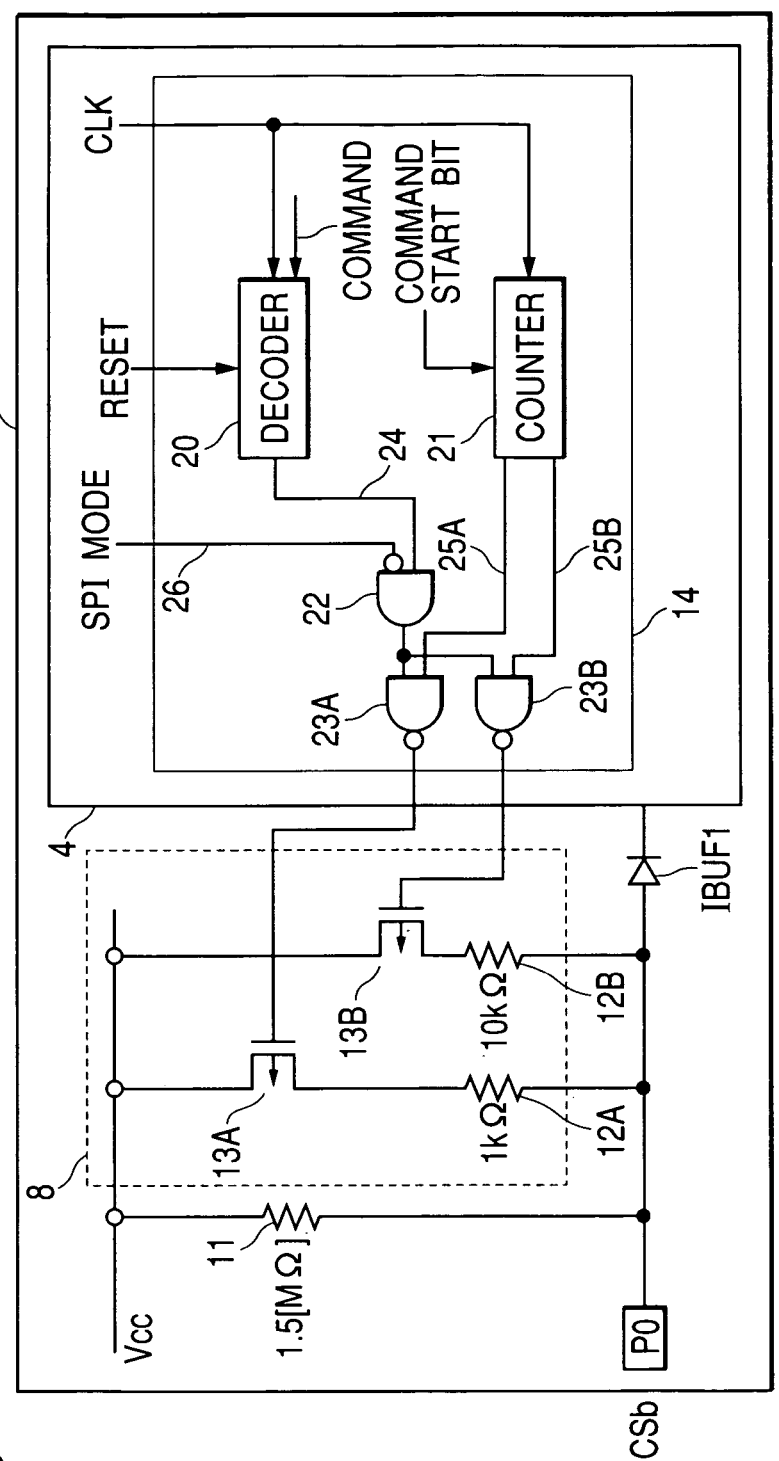
FIG. 10 is a circuit diagram showing an embodiment which enables stepwise switching of a pull-up resistor.

FIG. 10 shows an embodiment which enables stepwise switching of the pull-up resistor. The pull-up resistor circuit 8 is composed of a 1-kΩ pull-up resistor 12A, a switch transistor 13A, a 10-kΩ pull-up resistor 12B, and a switch transistor 13B. In the control logic circuit 14 for the switch transistors 13A and 13B, NAND gates 23A and 23B are provided distinctly for the respective switch transistors 13A and 13B in a one-to-one correspondence and the outputs 25A and 25B of the counter 21 are provided distinctly. The output 25A is maintained at the HIGH level during a period from the 8-th bit of the command counted from the start bit to the 16-th bit, while the output 25B is maintained at the HIGH level during a period from the 17-th bit of the command counted from the start bit to the 48-th bit.

Consequently, in the state where the card mode is not the SPI mode, the pull-up resistor 12A is selected during a period from the 8-th bit of the initialization command CMD0 counted from the start bit to the 16-th bit and the pull-up resistor 12B is selected during a period from the 17-th bit of the initialization command CMD0 to the 48-th bit. In short, the selection of the pull-up resistor 12A or 12B each having a lower resistance value is performed stepwise and the stepwise selection assumes that the lower resistance value is selected earlier. This accelerates the restoration of the terminal P0 to the HIGH level or the transition thereof from the LOW level to the HIGH level. Accordingly, even in a special case where the noise immunity of a memory host is low or the operating speed is over a maximum permissible speed, it becomes possible to ensure the termination of a signal change at the terminal P0, which is necessary for card mode determination, well ahead of a timing for the card mode determination. In short, the reliability of the card-mode determining operation in adverse environments can further be enhanced.

According to the result of a simulation, if the maximum operating frequency of the M card is assumed to be 20 MHz and the capacitance of the terminal P0 is 5 pF, the rising time of the terminal P0 is 15 nanoseconds (ns), 150 ns, and 750 ns when the resistance of the pull-up resistor is 1 kΩ, 10 kΩ, and 50 kΩ, respectively. Even if 750 ns is assumed to be necessary, 750 ns corresponds to 15 clock cycles so that a timing allowance is provided with the one-stage switching of FIG. 4 if consideration is given to the fact that the initialization command CMD0 requires 48 clock cycles.

Figure 11:
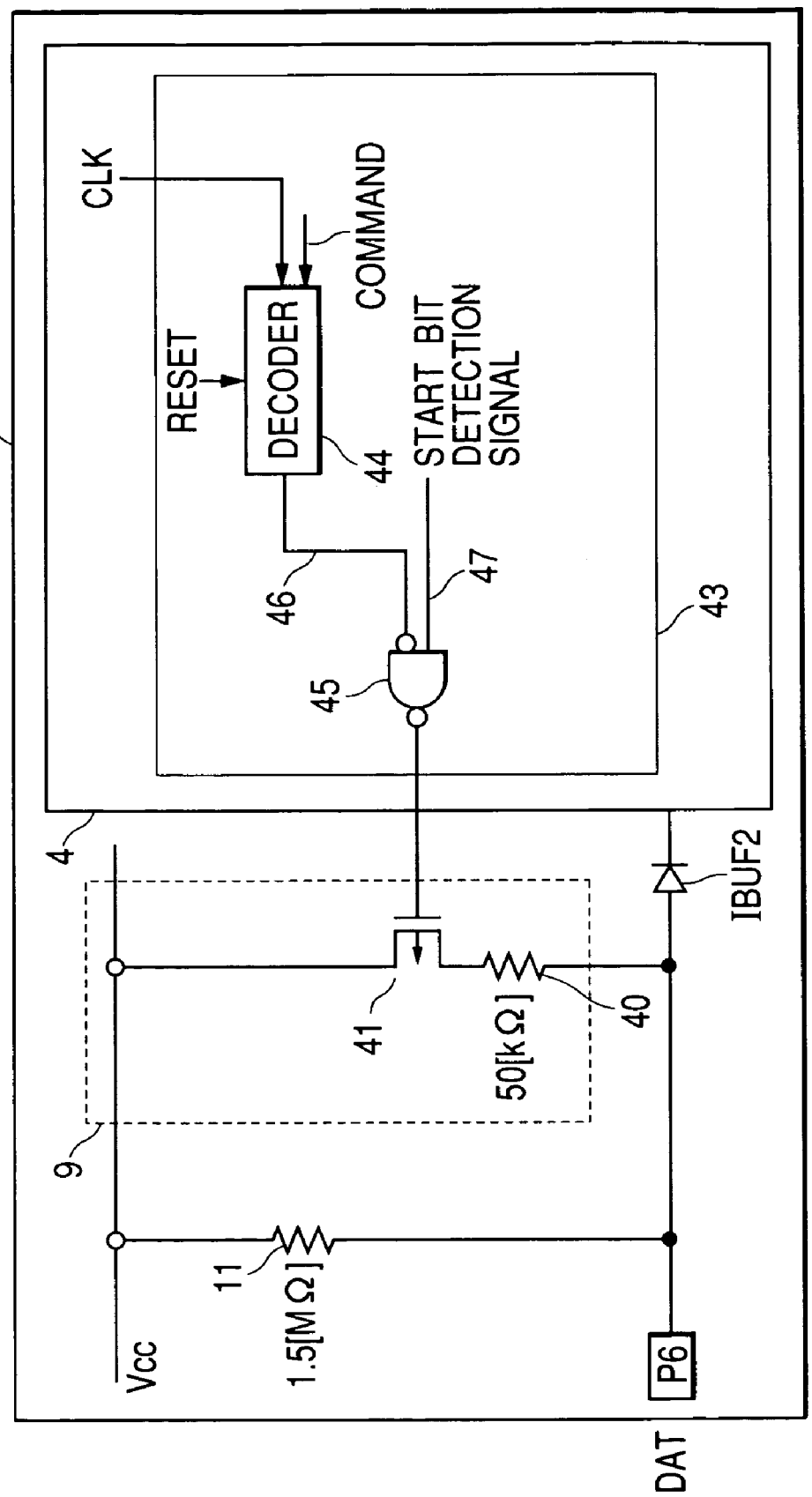
FIG. 11 is a circuit diagram illustrating the pull-up circuit of a data terminal and a control logic circuit therefor.

FIG. 11 illustrates the foregoing pull-up circuit 9 and a control logic circuit therefor. The pull-up circuit 9 is composed of a series circuit consisting of a 50-kΩ pull-up resistor 40 and a p-channel switch transistor 41, though it is not particularly limited to this configuration. The control logic circuit 43 is composed of a decoder 44 and a NAND gate 45. The decoder 44 decodes a command and asserts a signal 46 to the HIGH level by detecting a command CMD24. The NAND gate 45 receives the signal 46 and a start bit detect signal 47 for data to be written which is inputted subsequently to the write command CMD24 in inverted relation. The start bit detect signal 47 is asserted to the HIGH level by the detection of the start bit.

Thus, the pull-up resistor of the terminal P6 operated to function as the data terminal DAT is switched from a high resistance of 1.5 M kΩ to a low resistance 40 of 50 kΩ during a period from the detection of the command CMD24 till the detection of the start bit of the data to be written. The switching to the low resistance improves the noise immunity and enhances the reliability of the detection of the start bit of the data to be written.

Figure 12:
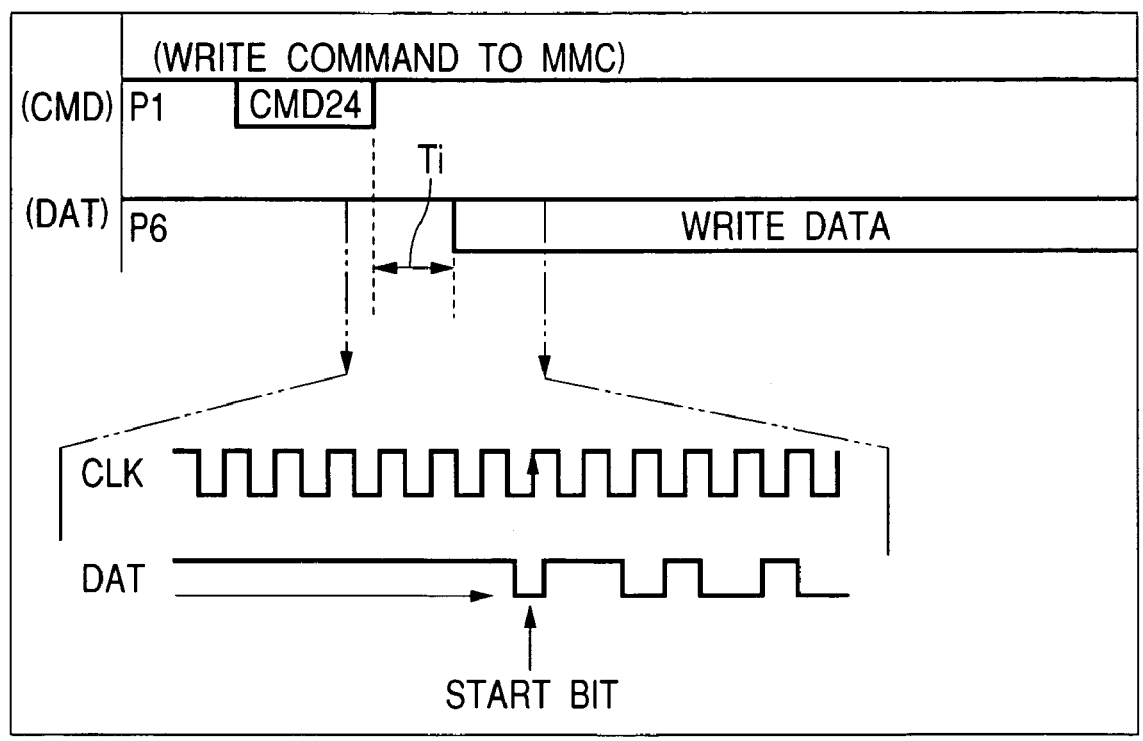
FIG. 12 is a timing chart illustrating a write operation to which the circuit of FIG. 11 is applied.

FIG. 12 illustrates a timing for a write operation. The period Ti is a period during which the pull-up resistor is switched from the high resistance of 1.5 MΩ to the low resistance 40 of 50 kΩ.

Although the invention achieved by the present inventors has been described specifically with reference to the embodiments thereof, the present invention is not limited thereto. It will be understood that various changes and modifications can be made in the invention without departing from the gist thereof.

For example, the selectable resistance value of the pull-up resistor is not limited to 50 kΩ and can be changed appropriately. The circuit of FIG. 11 is also disposed in a stage previous to the input buffer IBUF3 of FIG. 1, though the depiction thereof is omitted in FIG. 1. The present invention is applicable not only to the M card but also to memory cards of other standards and to another electronic device such as a communication card.

The following is the brief description of the effects achievable by the representative aspects of the invention disclosed in the present application.

That is, power consumption resulting from the pull-up resistor of an input terminal can be reduced. In addition, a memory card and an electronic device which are less susceptible to a misoperation induced by the pull-down resistor of a host apparatus can be provided.

A memory card as an M card which is accessible by an S card host can be provided.

What is claimed is:

1. A memory card comprising:
   a plurality of external terminals;
   an interface unit; and
   an erasable and writable nonvolatile memory,
   wherein said plurality of external terminals include a select terminal coupled to at least a pair of pull-up resistors including a low resistance value resistor and a high resistance value resistor to provide a pull-up resistance, and
   wherein said interface unit switches from said high resistance value resistor to said low resistance value resistor before performing a mode determination for the memory card based on an input from said select terminal during a mode determination period to perform said mode determination using said low resistance value resistor, and switches back to said high resistance value resistor after said mode determination period, and then is capable of starting data input for data storing or data output for data reading from/to a device outside the memory card based on a protocol resulting from said mode determination.

2. A memory card according to claim 1, wherein said mode determination for the memory card is performed in response to reception of an initialization command to the memory card.

3. A memory card according to claim 1, wherein, when said mode determination is performed, said interface unit sets an interface mode to a first operating mode in response to a HIGH level of said select terminal, and sets the interface mode to a second operating mode in response to a LOW level of said select terminal.

4. A memory card according to claim 3, wherein said memory card is based on a Multimedia Card standard, said first operating mode is an SPI mode, and said second operating mode is an MMC mode.

5. A memory card according to claim 1, wherein a selection of a low resistance value of the pull-up resistance is performed stepwise and the stepwise selection assumes that a lower resistance value is selected earlier.

6. A memory card according to claim 1,
   wherein said plurality of external terminals includes a data terminal coupling to a pull-up resistor, and
   wherein said interface unit selects a relatively low resistance value for the pull-up resistance of said data terminal during a period after a write command until a start bit of data to be written which is supplied to said data terminal is detected, and selects a relatively high initial resistance value after said detection of the start bit.

7. A memory card comprising:
   a plurality of external terminals including a select terminal; and
   an internal circuit having erasable and writable nonvolatile storing means,
   wherein said internal circuit lowers , in a mode determination period for performing a mode determination in response to an initialization command and based on an input from said select terminal, a value of a pull-up resistance of said select terminal before a determination timing, raises the resistance value of the pull-up resistance to an initial resistance value after said mode determination period, and then starts communicating between an outside device of the memory card based on a protocol resulting from said mode determination made using said lowered resistance value.

8. A memory card comprising:
   a plurality of external terminals including a data terminal; and
   an internal circuit having erasable and writable nonvolatile storing means,
   wherein said internal circuit lowers, during a period after receiving a write command until receiving a start bit of data to be written which is supplied to said data terminal is detected, a value of a pull-up resistance of data select terminal for a mode determination, raises the resistance value of the pull-up resistance to an initial value after said detection of the start bit, and then starts communicating between an outside device of the memory card based on a protocol resulting from said mode determination made using said lowered resistance value.

9. An electronic device comprising:
   a plurality of external terminals including a select terminal; and
   an internal circuit,
   wherein said internal circuit lowers, in a mode determination period for performing a mode determination in response to an initialization command and based on an input from said select terminal, an input impedance of said select terminal before a determination timing, raises the input impedance to an initial value after said mode determination period, and then starts communication between an outside device of the memory card based on a protocol resulting from said mode determination made using said lowered impedance value.

10. An electronic device comprising:
a plurality of external terminals including a data terminal; and
an internal circuit,
wherein said internal circuit lowers, during a period after receiving a write command until receiving a start bit of data to be written which is supplied to said data terminal is detected, an input impedance of select terminal for a mode determination, raises the input impedance to an initial value after said detection of the start bit, and then starts communication between an outside device of the memory card based on a protocol resulting from said mode determination made using said lowered impedance value.

* * * * *